United States Patent
Spevak et al.

(10) Patent No.: US 7,337,982 B1
(45) Date of Patent: Mar. 4, 2008

(54) IRRIGATION DEVICE

(76) Inventors: Randy Spevak, 40 Toscana Way East, Rancho Mirage, CA (US) 92270; Ronald Flakus, 2412 Shady Vista Dr., Las Vegas, NV (US) 89134; Elmer Bloom, HC 33 Box 33345, Ely, NV (US) 89301

( * ) Notice: Subject to any disclaimer, the term of this patent is extended or adjusted under 35 U.S.C. 154(b) by 319 days.

(21) Appl. No.: 11/067,244

(22) Filed: Feb. 24, 2005

Related U.S. Application Data

(60) Provisional application No. 60/651,011, filed on Feb. 8, 2005.

(51) Int. Cl.
*B05B 17/00* (2006.01)

(52) U.S. Cl. .............. 239/1; 239/11; 239/728; 239/723; 239/536; 239/722

(58) Field of Classification Search ........ 239/722–754, 239/1, 536, 166, 11; 119/502, 510
See application file for complete search history.

(56) References Cited

U.S. PATENT DOCUMENTS

| | | | | |
|---|---|---|---|---|
| 2,779,732 A | * | 1/1957 | Knowles | 210/150 |
| 2,956,750 A | * | 10/1960 | Singer et al. | 239/210 |
| 3,140,827 A | * | 7/1964 | Fletcher | 239/728 |
| 3,381,893 A | * | 5/1968 | Smith, Jr. et al. | 239/1 |
| 3,724,758 A | * | 4/1973 | Fizmaurice | 239/251 |
| 4,421,274 A | * | 12/1983 | Noble | 239/740 |
| 5,572,954 A | * | 11/1996 | Elkins | 119/502 |

* cited by examiner

*Primary Examiner*—Dihn Q. Nguyen
(74) *Attorney, Agent, or Firm*—Thomte Law Office; Dennis L. Thomte

(57) ABSTRACT

An irrigation device having a plurality of spans emanating from a common vertically oriented source of supply.

24 Claims, 4 Drawing Sheets

Figure 1:
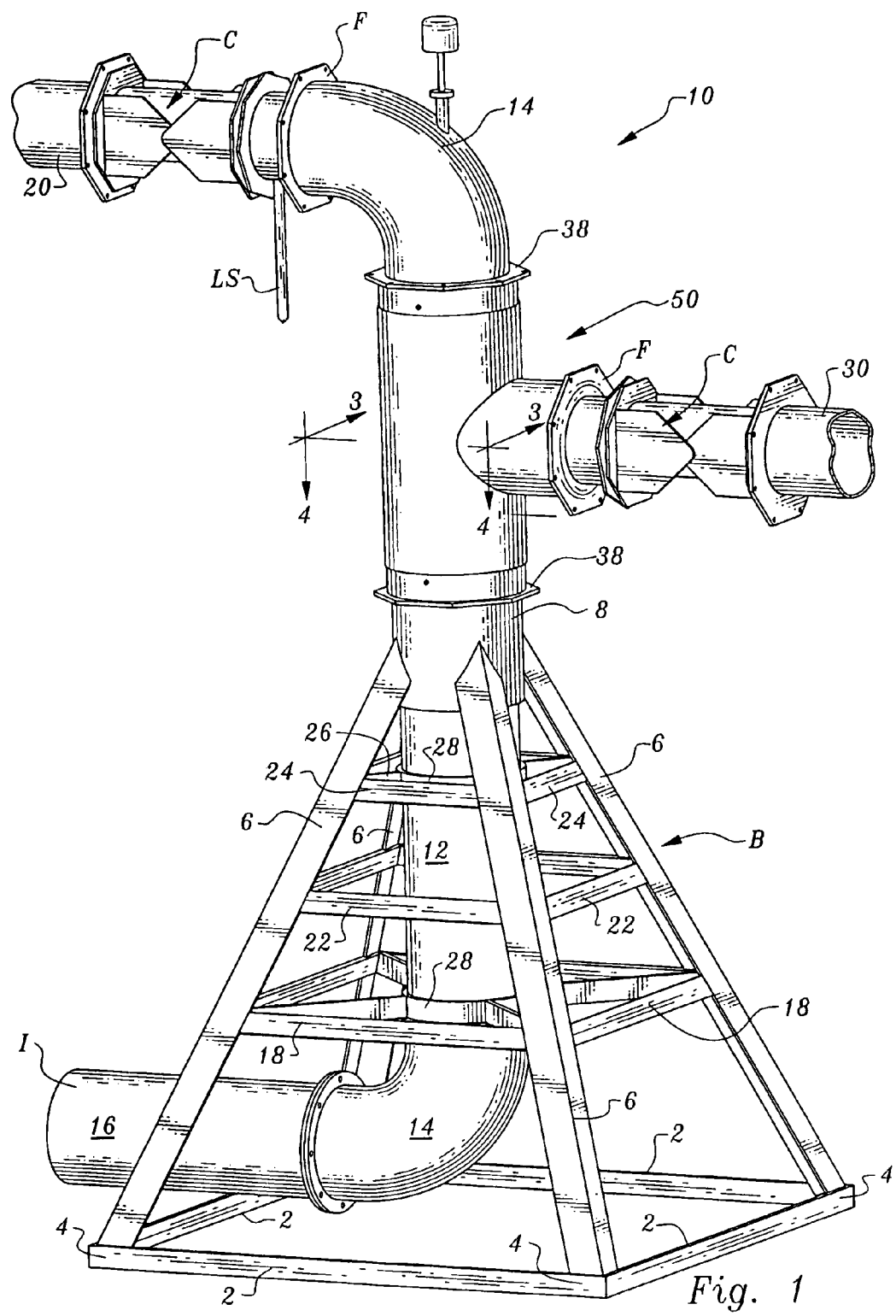

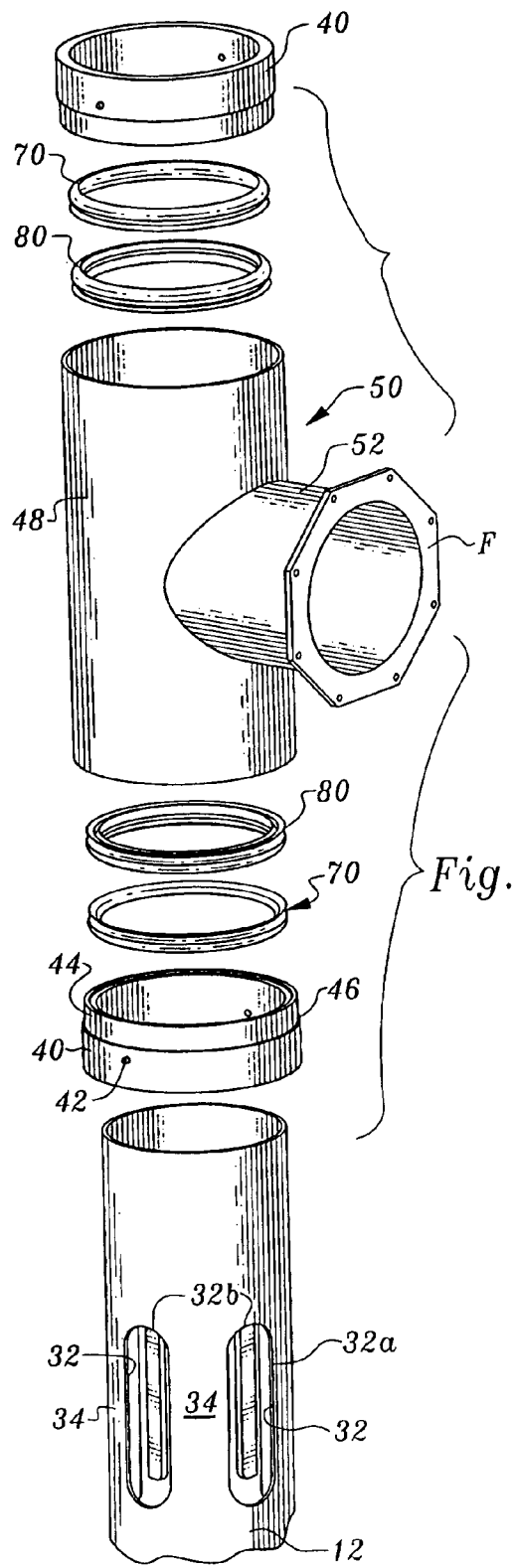
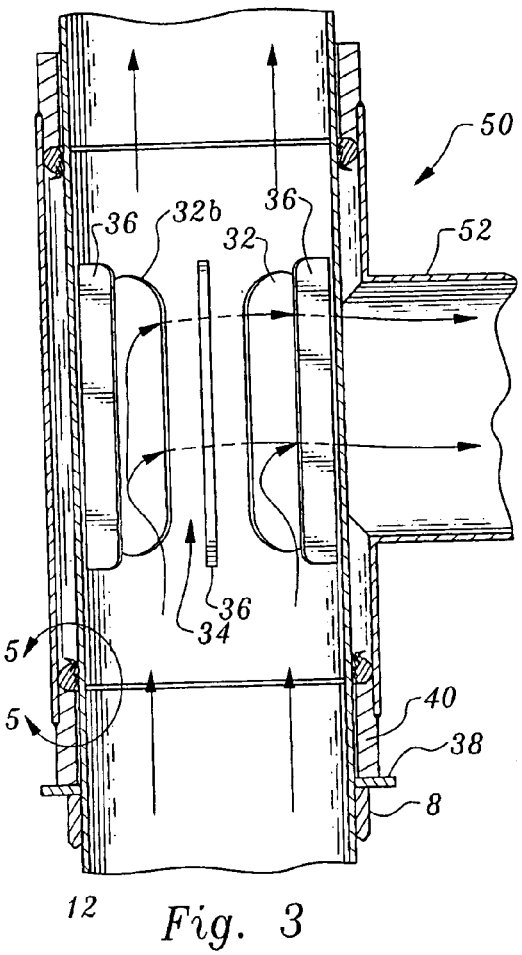
Fig. 2
Fig. 3
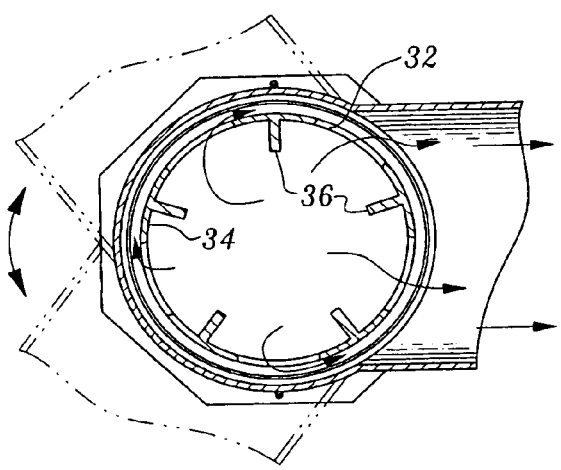
Fig. 4

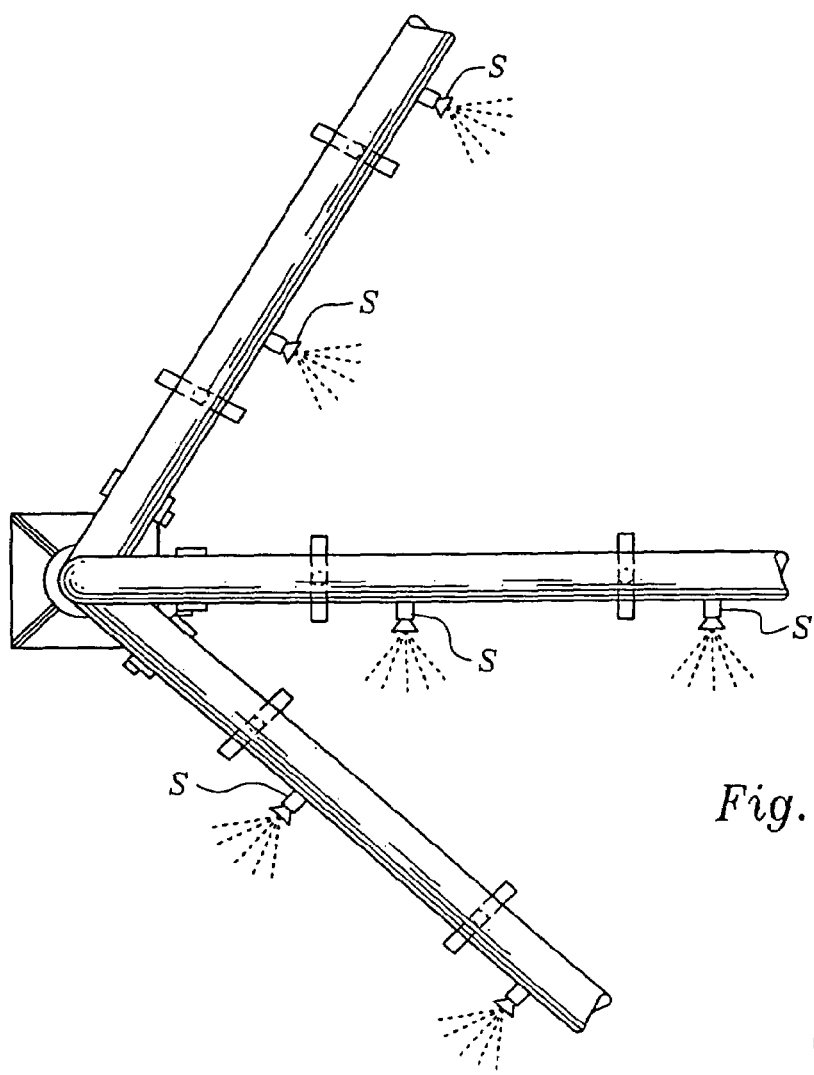
Fig. 7
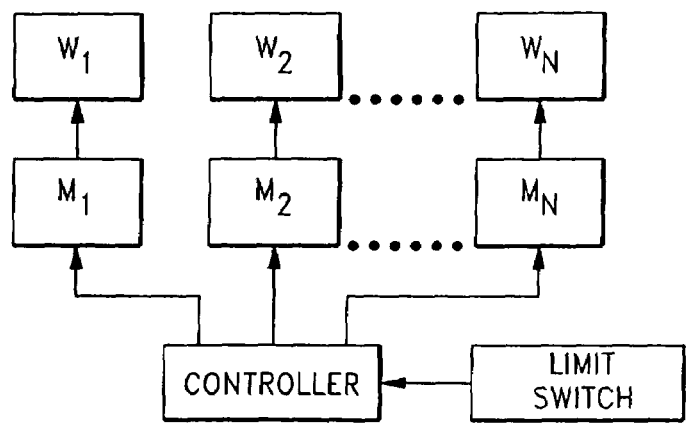
Fig. 8
Fig. 9

IRRIGATION DEVICE

CROSS-REFERENCE TO RELATED APPLICATION

This application claims the benefit of U.S. Provisional Application Ser. No. 60/651,011 entitled IRRIGATION SYSTEM HAVING TWO OR MORE SPANS EXTENDING FROM A CENTER PIVOT STRUCTURE filed Feb. 8, 2005.

FIELD OF THE INVENTION

The invention is directed toward an instrumentality which allows irrigation liquid to be dispensed. More particularly, the instant invention describes an irrigation device in which a first span and second span emanate from a central pivot area and irrigation liquid is dispensed through the first and second span in such a manner that an included angle exists between the first and second span, spacing the two spans apart, such that plants or seedlings under each span are treated with successive applications of liquid as the first span passes thereover and subsequently the second span passes thereover.

BACKGROUND OF THE INVENTION

Optimal plant husbandry requires adherence to the art of irrigation with a fair degree of precision. While established plants can tolerate over and under watering to a certain degree, seedlings are not so tolerant. Efficient farming practices demands that seedlings have a relatively high germination rate with very few areas planted being bare due to improper planting techniques. Uneven terrain coupled with improper irrigation will cause gaps in the produce being germinated from seed, and improper watering seedlings will have a deleterious effect in achieving a proper germination rate.

Extremely small seeds, such as carrot seeds, have a very poor germination rate using conventional irrigation techniques. The primary problem involves controlling the amount of irrigation liquid (e.g., water) and its effect on the seedling when exposed on a surface for germination. Because very small seedlings are unduly influenced by heavy water disposition, small seedlings will fail to stay in a designated spot and instead wash away with the irrigation water into low-lying areas, thereby increasing the seedling density in one area to the exclusion of other areas. Crowded seedlings insure small sized crops unless thinned, requiring manual labor. Even though the art of broadcasting small seedlings in a uniform density is a fairly well-established practice, the art of retaining small seedlings in the spots to which they had been broadcast is difficult when the required subsequent irrigation causes seeds to run-off.

In conventional irrigation systems, a vertical pipe communicates with a horizontal span emanating radially from the vertical pipe and adapted to rotate in a circle about the vertical pipe. By having the horizontal span rotate in a 360-degree arch, one revolution of the span results in a complete irrigation of the underlying area contained beneath the span. A horizontal span as described extends radially outward from the vertical pipe several hundred feet. As a consequence, one complete rotation of the horizontal span can take a considerable amount of time such that successive passes over the same area will not occur frequently enough for small seedlings. Thus, the farmer is faced with the difficult choice of applying a relatively fine mist of water to the delicate seedlings on an intermittent basis and hope for a high germination rate. It bears recalling that soil can only absorb the irrigation liquid at a certain rate, so the farmer is limited with respect to the amount of water that can be dispensed on a single pass versus the amount of time that successive passes can occur on a single span system. Thus, the dilemma heretofore faced by the farmer, is the delicate balancing of spray rate per single pass of a single span versus the absorption of the underlying soil and the seedling size to retain the seed in the desired location and also not wash of soil or other matter cover up the seedlings.

The following patents reflect the state of the art in which Applicant is aware and are included to discharge Applicants acknowledged duty to disclose prior art. It is stipulated that none of the patents teach singlely nor render obvious when considered at any conceivable, permissible combination the nexus of the instant invention as set forth in greater detail herein below.

U.S. Pat. No. 3,647,139 (De Long, Jr., et al.) issued Mar. 7, 1972 to DeLong Jr. et al, provides a rotating tower or turret irrigating or liquid dispensing apparatus which has opposed, horizontally extending, side arm assemblies made up of a plurality of coupled-together liquid-carrying pipe or conduit members that are carried on a central column or mast and provided with sprinkling means or spray heads for rotatably covering a large ground area from a fixed central axis. Each conduit or pipe member is suspended adjacent its opposite ends by cord members that are connected to a column-mounted spread bracket, and is tension-stressed in its positioning along its length between the suspending cord members. This device has four arms 90 degrees apart which are all suspended from a tall center tower and all the arms are driven by a centrally positioned drive wheel.

U.S. Pat. No. 3,902,668 (Daugherty, et al) issued Sep. 2, 1975 to Daugherty, is for a modified center pivot irrigation system for providing a means of irrigating closer to the edges of a square field. The system is modified by adding a secondary boom extension to the end of the distal span of the main boom. The boom is guided along a path defined by an electrical conductor.

U.S. Pat. No. 4,721,061 (McNatt), issued Jan. 26, 1988 to McNatt, shows an apparatus for grazing management and irrigation of a field. A labyrinthine path for animals is defined in the pasture and a movable radially-extending arm carrying an electric fence causes the animals to traverse the labyrinthine path at a very slow rate, e.g. once every two weeks. The arm comprises structure for irrigating the pasture by a gentle drip feed method whereby efficiency in use of both water and land is obtained. A T-joint is pivotally mounted on top of the center post so the two arms are always aligned 180 degrees apart.

U.S. Pat. No. 5,572,954 (Elkins), issued Nov. 12, 1996 to Elkins, provides two center-pivot irrigation systems utilized for controlling grazing. A preceding and succeeding center-pivot system contain electrified fences for containing herds and controlling the extent of their grazing. The preceding system contains water tanks for the herd and the succeeding system irrigates the pasture. together the systems eliminate overgrazing and improve the quality of the herd. There is a ball and socket joint connection between the two arms which only allows 180 degrees of separation between the arms.

U.S. Pat. No. 6,726,132 (Malsam) issued Apr. 27, 2004 to Malsam, claims a corner irrigation system, which includes an ultra wide band (UWB) guidance system. The self-propelled irrigation machine includes an elongated main boom pivoted at one end to a center pivot and supported on a plurality of self-propelled, non-steerable drive units. An extension boom is pivotally secured to the other end of the main boom for irrigating corner areas of the field. A steerable drive tower supports the extension boom and includes a pair of steerable rive wheels. The guidance and control for the extension boom includes a UWB receiver and a computer positioned on the steerable drive tower for receiving and processing UWB information as to the location of the steerable drive tower and for determining the optimal steer angle for the steerable drive wheels relative to the movement of the main boom. At least one UWB transmitters are located within receiving range of the UWB receiver. Signals transmitted by the UWB transmitters are received by the UWB receiver on the steerable drive unit and are used to determine current location and optimal steer angle relative to the main boom.

U.S. Patent Application No. 20040093912, published May 20, 2004 by Krieger, is for an irrigation system for conveying a fluid to a region. The irrigation system comprises a main irrigation portion having an end irrigator span. A corner irrigator span extends radially from the end irrigator span. A control system controls movement of the corner irrigator span. The control system includes a linear movement control system to control a corner drive unit of the corner irrigator span and a steering control system, which controls a steering unit of the corner irrigator span. The steering control system includes a controller that receives control signals from four electrical generators to control the steering unit such that the corner irrigator span follows along an outer boundary of the region. At least one of the electrical generators is an electronic compass for sensing a reference signal to determine a primary control position of the main irrigation portion.

SUMMARY OF THE INVENTION

The instant invention is distinguished over the known prior art in a multiplicity of ways. In addition to a first horizontal span, which emanates from a vertical pipe that provides the irrigation fluid, at least one additional span emanates directly from the same vertical pipe and in fluid communication therewith. These first and second horizontal spans are spaced one from the other both in vertical elevation, and each span is separated one from the other such that an included angle exists between the spans, the included angle being adjustable. While the instant invention extols the virtues of a first horizontal span and a second horizontal span separated one from the other by an included angle, the following description will make it evident that a third or fourth (i.e., plural) successive spans can be placed in vertical registry and separated one from the other by an included angle should it be desired that more than two spans be used in an irrigation environment.

In order to have more than one span emanate from a vertically extending pipe, a substantially "T" shaped pipe structure is plumbed into the vertical pipe such that fluid flow is permitted through one horizontal leg of the "T" while the remaining two legs of the "T" are in overlying alignment with the vertical pipe having holes allowing the through-passage of fluid there beyond. A seal exists along extremities of the overlying vertical segments of the "T" such that irrigation liquid will not leak from the "T".

By having more than one span radiate from the vertical pipe, by having more than one span address the underlying soil, a farmer can precisely control the amount of irrigation fluid being dispensed on crops, particularly seedlings, to balance the seedlings need for moisture versus the ability of the soil to absorb the liquid being received from the irrigation appliance. Preferably, first and second irrigation spans are separated one from the other by an included angle such that the first span provides irrigation fluid to the seedlings at an optimal rate for absorption by the soil and a successive span follows thereafter dispensing liquid at a same or different rate from the first span based on the soil's ability to absorb the additional liquid. By having successive spans dispense liquid on the seedlings, the seedlings can benefit from a relatively mild dispensation of irrigation fluid, preventing run-off, pooling, or other undesirable attributes in the irrigation process resulting in a higher germination rate and achieving uniform seed density in the desired areas.

OBJECTS OF THE INVENTION

Accordingly, it is a primary object of the present invention to provide a new and novel irrigation apparatus.

It is a further object of the present invention to provide an apparatus as described above which takes into account the particularized needs of crops which are receiving the irrigation liquid in such a manner as to optimize the irrigation fluid dispensation for the maximum benefit of the crops.

It is a further object of the present invention to provide a corresponding method that complements the apparatus.

It is a further object of the present invention to provide an apparatus and method as delineated here and above, which is easy to install, lends itself to mass production techniques, and can be controlled with a high degree of accuracy with a minimum amount of technical training.

A further object of the present invention is to provide a device and method as characterized here and above which improves the germination rate of seedlings and promotes uniform seed density.

A further object of the present invention is to provide a device and method as characterized above which allows the dispensation of irrigation fluid to be provided in successive stages to balance the absorption ability of the soil vis-à-vis the plants or seedlings particularized needs.

A further object of the present invention is to provide an apparatus and method as characterized above including a system to insure that successive spans of the irrigation apparatus move in synchrony.

A further object of the present invention is to provide a method, apparatus, and system in which the dispensation rate of the fluid can be controlled with respect to output in successive spans.

A further object of the present invention is to provide a device, method, and systems as set forth above in which additives may be included in one or more of the spans.

Viewed from a first vantage point, it is an object of the present invention to provide an apparatus for dispensing irrigation fluid comprising in combination a first span, a second span, said first and second spans each having one end, said one end terminating at a common pivot fluid dispensing point.

Viewed from a second vantage point, it is an object of the present invention to provide a method for irrigation, the steps including providing a first span, allowing the first span to move about an arc having a fixed pivot point, providing a second span, allowing the second span to pivot about the same pivot point, and separating the first and second span from each other by an included angle.

Viewed from a third vantage point, it is an object of the present invention to provide a system for increasing the germination rate of seedlings by providing irrigation fluid through a first span overlying the seedlings, providing irrigation fluid from a second span overlying the seedlings, spacing the first and second spans from each other by an included angle and having both the first and second span end in vertical alignment while receiving fluid from a common source.

These and other objects will be made manifest when considering the following detail specification and taken in conjunction with the appended drawings figures.

BRIEF DESCRIPTION OF DRAWING FIGURES

Figure 5:
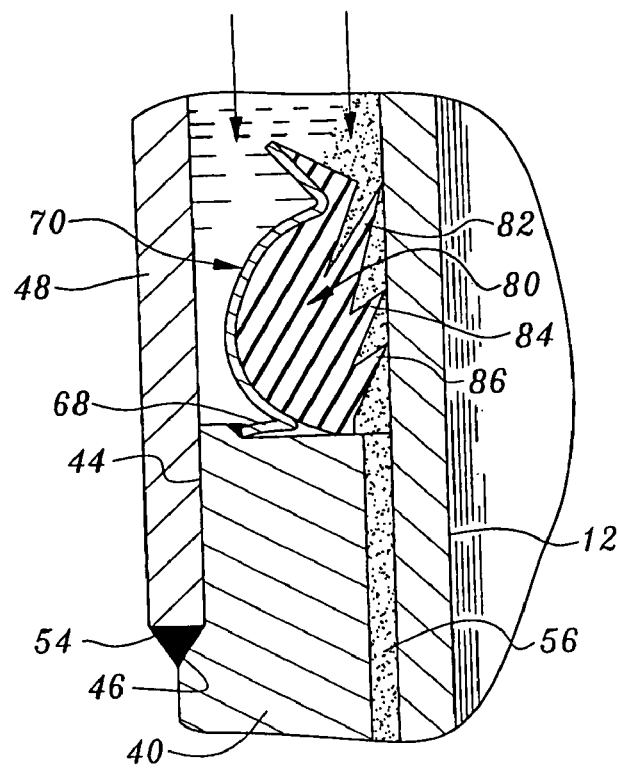
Figure 6:
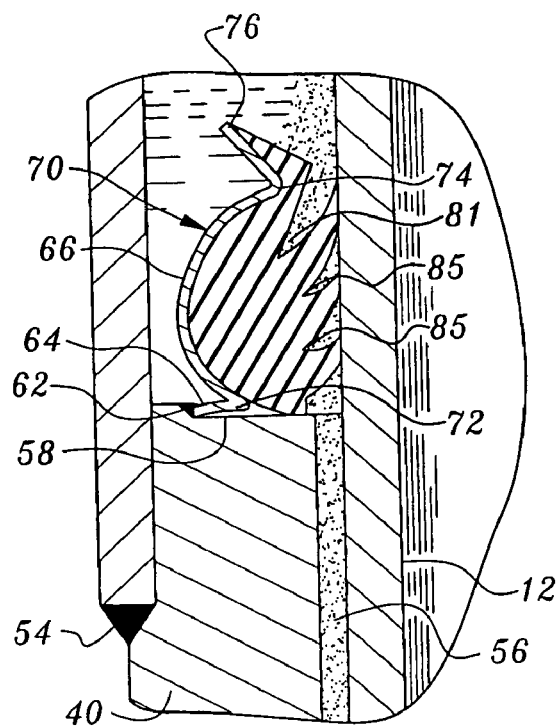

FIG. 1 is a perspective view of the apparatus.
FIG. 2 is an exploded parts view of key elements of the apparatus.
FIG. 3 is a sectional view taken along lines 3-3 of FIG. 1.
FIG. 4 is a sectional view taken along lines 4-4 of FIG. 1.
FIG. 5 is a sectional view taken along lines 5-5 of FIG. 3.
FIG. 6 is a second view of FIG. 5.
FIG. 7 is a top vie of one possible multi-span arrangement.
FIG. 8 is a schematic depiction of maintaining span spacing.
FIG. 9 is a schematic depiction of flow control of the irrigation fluid.

BRIEF DESCRIPTION OF THE PREFERRED EMBODIMENTS

Considering the drawings, wherein like numbers denote parts, reference numeral 10 is directed to the irrigation device according to the present invention.

In its essence, the irrigation device 10 includes a base B which supports the device 10. The irrigation device 10 includes an irrigation conduit having an inlet I for a first span 20 and a second span 30 each having a plurality of spray outlets S as seen in FIG. 7 which dispense irrigation fluid onto the crops and on the terrain there below.

More particularly, the base B is configured as a substantially skeletal pyramid which is shown as being pentahedral but may also have been configured as a quadrahedral or other stable base. The pyramid base B includes a lower rectangular frame formed from bar stock 2 which resides upon the terrain. The rectangular frame 2 includes corners 4 which support upwardly extending and inwardly declinated angle irons 6 having upper extremities with are mitered and support a sleeve 8 of the irrigation device 10 in fixed position.

Sleeve 8 overlies a portion of a vertical conduit 12 which descends downwardly and terminates in an elbow 14 leading to a horizontal run of conduit 16 and thence to the inlet I. The portion of the vertical pipe below the sleeve 8 is held in fixed relationship with respect to the base B by means of a series of rectangular braces 18, 22, 24 which tie into the angle irons 6 as shown in FIG. 1 and may include radially inwardly directed spokes 26 which extend to collar 28 disposed on the vertical pipe 12 to hold the vertical pipe 12 in a fixed vertical axis. As shown in FIG. 1, because the base is substantially pyramidal, the successively higher braces 22, 24 have lesser length than that which is lower therefrom and similarly, the radially inward spokes 26 also have lesser length as they extend upwardly.

As thus described, the structure associated with the base is stationary. FIG. 2 shows a free end of the vertical pipe 12 as it is about to pass through the irrigation "T" 50. FIG. 3 shows that the vertical pipe 12 includes a plurality of openings 32 cut into the pipe and extending into it's interior. These openings 32 are substantially oval in shape. As shown diagrammatically in FIGS. 3 and 4, water or other irrigation fluid carried in the vertical pipe 12 carried from inlet I can pass through these elongate oval openings 32. As shown in the drawings, the elongate oval openings include first and second elongate linear slits 32a which run parallel to the vertical axis of the vertical pipe 12. These slits 32a terminate in arcuate end edges 32b which unite the slits thereby forming the oval openings. Each of the oval openings 32 are separated one from the other by non-foraminous sections 34 of pipe. As shown in FIGS. 3 and 4, medial portions of these sections 34 include ribs 36 which are welded on the interior of the pipe and preferably equal spaced from adjacent oval openings 32. These ribs are preferably oriented parallel to the vertical axis of the vertical pipe 12 and are intended to provide rigidification of the pipe at the location of the oval openings to prevent flexing and premature failure. As shown in FIG. 3, the ribs 36 are substantially coextensive with the length of the oval openings and have terminal portions extending just beyond the arcuate end edges 32b.

The irrigation "T" 50 is supported at it's lower extremity by a collar which sits upon a flange 38 fixed to pipe 12. Grease fittings 42 (e.g. FIG. 2) admit lubricant. The collar 40 has a cylindrical inner diameter substantially complemental to the exterior diameter of the vertical pipe 12 and an exterior diameter which includes an upper portion 44 which is stepped inwardly thereby providing a shelf 46. As shown in FIGS. 5 and 6, the shelf 46 is preferably chamfered at a 90 degree angle with respect to a horizontal and vertical plane. As shown in the drawings, the irrigation "T" 50 includes a vertical section and a substantially medially disposed horizontal section in fluidic communication such that the "T" is viewed on its "side". The vertical section 48 has free ends which are dimensioned to over-lie the stepped in portion 44 of the collar 40 and sit atop the shelf 46. As indicated in FIGS. 5 and 6, a weld 54 circumscribes the juncture between the vertical section's free end and its abutting relationship with the stepped in portion 44 of the collar 40 at the shelf area 46 to provide a rigid and substantially fluid tight coupling. In order to reduce any fluid flow that may tend to migrate from the oval openings 32 and between the collar 40 and the vertical pipe 12, a hydrophobic or liquid impervious paste is introduced between the juncture of the collar 40 and the pipe 12. Preferably this paste 56 is highly viscous grease is axle grease and is resistant to fluidic pressure even at relatively high pressures.

In order to assist the paste 56 in performing its function, a seal is provided at the junction of the collar as it faces the irrigation "T" 50. More particularly, a substantially annular depression 58 is disposed on a face of the collar 40 facing the central area of the irrigation "T" 50. The depression 58 includes a peripheral wall 62 declinated upwardly and radially outwardly at an approximately 45 degree angle to serve as a weldment area for a welding bead 64 at the peripheral wall. The welding bead unites the collar to a resilient, preferably metallic gasket support 70. The gasket support 70 includes a central, arcuate middle portion 66 holding a major portion of the gasket in place, the middle portion 66 terminating at an extremity adjacent to the collar 40 in a foot 68 which has a portion that resides within the depression 58, and a free end of the foot 68 is the object of attachment by the welding bead 64 to the peripheral wall 62 the collar 40. Thus, the foot 68 includes (looking from the weld radially inward) the foot section, and then a turned back portion or hair-pin 72 which leads to the middle portion 66. An opposed free end of the gasket support 70 includes another hair-pin turn 74 directing a free end 76 of the gasket support upwardly and outwardly relative to a central line of the vertical pipe. Thus, when viewing the section of the gasket support 70 as shown in FIGS. 5 and 6, the gasket support may be viewed as an arc in its medial portion having free ends which project outwardly away from the arc at a somewhat acute angle at both extremities for purposes to be assigned.

The seal that is provided between the gasket support and the vertical pipe 12 is preferrably achieved by a one-piece gasket 80 having an outer periphery substantially complemental to the inner periphery of the gasket support 70. Both gasket support 70 and gasket 80 can be purchased from Pierce Corporation's Fresno Valve and Casting except that support 70 has been modified from part number 1669-47 while gasket (part number 321904) remains unmodified. The gasket 80 is preferably formed from an elastomer, either synthetic or natural, substantially toroidal in shape having an inner face which addresses the vertical pipe 12 by means of a plurality of prongs 82, 84, 86 which project inwardly and are biased towards a vertical center line of the pipe, the prongs 82, 84, 86 generally pointing towards a central area of the irrigation "T" 50, i.e., towards the horizontal section 52. The prongs are thus oriented such that when irrigation fluid escapes through the oval openings 32, the prongs address the hydrostatic pressure associated with the fluid forcing the prongs to move away from the gasket 80 and towards the vertical pipe 12 such that the greater the hydraulic force exhibited by the irrigation fluid, the greater the seal that exists between the gasket 80 and the vertical pipe 12. As mentioned earlier, a paste 56 is applied along the area between the collar 40 and the vertical pipe 12. It is also desired that this paste be located between adjacent apices 81, 83, 85 of the prongs 82, 84, 86. FIGS. 5 and 6 can be studied to show the contrast that is exhibited when hydrostatic forces are applied through the oval openings 32. The free ends of the prongs 82, 84, 86 distort and come in contact or tangential registry with the vertical pipe 12 as seen in FIG. 6.

FIG. 2 reflects similar structure for the top of the irrigation "T" 50 as was described in detail with respect to the lower aspect of the irrigation "T" such that the forces to be resisted all stem from fluid coming from the oval openings 32. In other words, if FIGS. 5 and 6 were to be viewed upside-down, the analysis for the lower part of FIG. 2 would apply to the upper part of FIG. 2.

As shown in the drawings, the horizontal section 52 terminates in a flange F which communicates with the second span 30 having components frequently found on first spans of known irrigation systems. For example, a flex coupling C is interposed between the flange F and the second span to allow articulation of the second span as is common with respect to known first spans. Similarly, the flexible coupling C can be found in FIG. 1 as it addresses a first span 20 which communicates with an upper extremity of the irrigation "T" 50 at its upper most vertical extremity by means of another flange 38 discussed herein below. An elbow 14 is interposed between the first span and that flange.

Having thus described the invention, it should be apparent that numerous structural modifications and adaptations may be resorted to without departing from the scope and fair-meaning of the instant invention. For example, in use and operation, each span is caused to move about the vertical axis defined by a central vertical line of the vertical pipe 12 via translation of the spans through means supporting the spans above the ground, typically wheeled carriages (FIG. 7) frequently seen on single span irrigation systems. The rate at which the wheels W of the single span irrigation systems are moved is typically controlled by hydraulic or electrical drive through motors M (FIG. 8) that drive at least one set of wheels on the span. In the present invention, a controller is in operative communication with the wheels on the spans to assure that each span individually moves at a controlled rate such that the included angle between the first span and successive spans can be maintained constant or varied within certain parameters. By varying the included angle between the first span and a successive span, the distance between the spans may be varied. In addition, as a fail-safe, the controller can be supplemented with a limit switch that physically senses the presence of one span vis-à-vis the other span to override the motor motion of the wheels to assure that spans maintain appropriate distances one from the other and prevent spans and their attendant substructure from colliding. As suggested, the limit switch can be one based on physical contact or proximity. In addition, a flow controller (FIG. 9) can be provided in the multiple spans which can control the flow rate of the liquid as it is to be dispensed from the span and/or control the choice of different liquids (L, $L_2$, etc.) to pass there beyond to a valve or spray outlet S.

The invention claimed is:

1. A center pivot irrigation system, comprising:
a center pivot structure including a vertically disposed water supply pipe having upper and lower ends and inner and outer surfaces;
said water supply pipe being fluidly connected to a source of water under pressure;
said water supply pipe having a plurality of radially spaced water discharge openings formed therein below its said upper end;
a first collar rotatably embracing said water supply pipe below said water discharge openings;
said first collar having upper and lower ends and inner and outer surfaces;
said first collar having an outwardly presented shelf formed in said outer surface thereof intermediate said upper and lower ends thereof;
a first annular flexible seal, having inner and outer ends, positioned at the upper end of said first collar;
said first annular flexible seal being in sealing engagement with said outer surface of said water supply pipe to prevent the flow of water downwardly between said first collar and said water supply pipe;
a T-connector including a vertical pipe portion having an inner surface, an outer surface, an upper end and a lower end, said T-connector including a horizontal pipe portion extending from said vertical pipe portion; said horizontal pipe portion having an inner end, an outer end, an inner surface and an outer surface;
said vertical pipe portion of said T-connector rotatably embracing said water supply pipe;
said lower end of said vertical pipe portion of said T-connector being in engagement with said shelf on said first collar and being fixed to said first collar for rotation therewith;
a second collar having upper and lower ends and inner and outer surfaces;
said second collar having an outwardly presented shelf formed in said outer surface thereof intermediate said upper and lower ends thereof;

said upper end of said vertical pipe portion being in engagement with said shelf formed in said outer surface thereof and being fixed to said collar for rotation therewith;

a second annular flexible seal positioned at said lower end of said second collar;

a first span structure including a water delivery pipe with inner and outer ends;

said inner end of said first span structure being in fluid communication with said outer end of said horizontal pipe portion of said T-connector;

a second span structure including a water delivery pipe with inner and outer ends;

said inner end of said second span structure including an elbow pipe connector having vertical and horizontal pipe portions;

said vertical pipe portion of said elbow pipe connector having inner and outer surfaces;

said vertical pipe portion of said elbow pipe connector being rotatably received by said upper end of said second collar;

said second flexible seal being in sealing engagement with said outer surface of said vertical pipe portion of said elbow pipe connector;

each of said first and second span structures being supported upon at least one self-propelled drive unit.

2. The center pivot irrigation system of claim 1 wherein a first seal backing plate, having inner and outer surfaces, is secured to the upper end of said first collar and extends upwardly therefrom; said first annular flexible seal being positioned at said inner surface of said first seal backing plate and wherein a second seal backing plate, having inner and outer surfaces, is secured to the lower end of said second collar and extends downwardly therefrom; said second annular flexible seal being positioned at said inner surface of said second seal backing plate.

3. The center pivot irrigation system of claim 2 wherein said inner ends of said first and second annular flexible seals each have a plurality of vertically spaced-apart prongs which extend inwardly therefrom.

4. The center pivot irrigation system of claim 2 wherein said backing plates are welded to said collars.

5. The center pivot irrigation system of claim 1 wherein each of said radially spaced openings are oval in shape.

6. The center pivot irrigation system of claim 5 wherein each of said oval openings have a longitudinal axis which is parallel to the longitudinal axis of said water supply pipe.

7. The center pivot irrigation system of claim 6 wherein said water supply pipe has elongated reinforcing members secured to its inner surface which extend across said water discharge openings.

8. The center pivot irrigation system of claim 1 wherein each of said first and second span structures are independently pivotally movable with respect to said center pivot structure.

9. A center pivot irrigation system, comprising:
a center pivot structure including a vertically extending water supply pipe having upper and lower ends and inner and outer surfaces;

said water supply pipe being fluidly connected to a source of water under pressure;

said water supply pipe having a plurality of radially spaced water discharge openings formed therein below its said upper end;

a T-connector including a vertical pipe portion having an inner surface, an outer surface, an upper end and a lower end;

said T-connector also including a horizontal pipe portion extending from said vertical pipe portion, said horizontal pipe portion having an inner end, an outer end, an inner surface and an outer surface;

said vertical pipe portion of said T-connector rotatably embracing said water supply pipe and being in fluid communication with said water discharge openings;

a first seal between said vertical pipe portion and said water supply pipe below said horizontal pipe portion;

a second seal between said vertical pipe portion and said water supply pipe above said horizontal pipe portion;

a first span structure including a water delivery pipe with inner and outer ends;

said inner end of said first span structure being in fluid communication with said outer end of said horizontal pipe portion of said T-connector;

a second span structure including a water delivery pipe with inner and outer ends;

said inner end of said second span structure including an elbow pipe connector having vertical and horizontal pipe portions;

said vertical pipe portion of said elbow pipe connector being rotatably received by said upper end of said vertical pipe portion of said T-connector;

each of said first and second span structures being supported upon at least one self-propelled drive unit.

10. The center pivot irrigation system of claim 9 wherein each of said radially spaced openings are oval in shape.

11. The center pivot irrigation system of claim 10 wherein each of said oval openings have a longitudinal axis which is parallel to the longitudinal axis of said water supply pipe.

12. The center pivot irrigation system of claim 11 wherein said water supply pipe has elongated reinforcing members secured to its inner surface which extend across said water discharge openings.

13. The center pivot irrigation system of claim 9 wherein each of said first and second span structures are independently pivotally movable with respect to said center pivot structure.

14. A self-propelled center pivot irrigation system for irrigating an area over which the system passes, comprising:
a center pivot structure including a vertically extending water supply pipe having upper and lower ends;

said water supply pipe being fluidly connected to a source of water under pressure;

a first irrigation span structure including a water delivery pipe with inner and outer ends;

said inner end of said first irrigation span structure being pivotally secured to said center pivot structure and being in fluid communication with said water supply pipe;

a second irrigation span structure including a water delivery pipe with inner and outer ends;

said inner end of said second irrigation span structure being pivotally secured to said center pivot structure and being in fluid communication with said water supply pipe;

each of said water delivery pipes of said first and second irrigation span structures having a plurality of spaced-apart spray outlets associated therewith for irrigating the area adjacent said first and second irrigation span structures;

each of said first and second irrigation span structures being supported upon at least one self-propelled drive unit;

each of said first and second irrigation span structures being independently pivotally movable with respect to said center pivot structure so that the distance between said first irrigation span structure and said second irrigation span structure may be selectively varied.

15. The center pivot irrigation system of claim 14 wherein a T-connector including a vertically disposed connector section and a horizontally disposed connector section is provided with said vertically disposed connector section rotatably embracing said water supply pipe; the inner end of one of said first and second irrigation span structures being fluidly connected to said vertically disposed connector section, the other of said first and second irrigation span structures being fluidly connected to said horizontally disposed connector section; said T-connector being in fluid communication with the water in said water supply pipe.

16. A self-propelled center pivot irrigation system for irrigating an area over which the system passes, comprising:
   a center pivot structure including a vertically extending water supply pipe having upper and lower ends and inner and outer surfaces;
   said water supply pipe being fluidly connected to a source of water under pressure;
   said water supply pipe having a plurality of radially spaced water discharge openings formed therein below its said upper end;
   a T-connector including a vertical pipe portion having an inner surface, an outer surface, an upper end and a lower end;
   said T-connector also including a horizontal pipe portion extending from said vertical pipe portion, said horizontal pipe portion having an inner end, an outer end, an inner surface and an outer surface;
   said vertical pipe portion of said T-connector rotatably embracing said water supply pipe and being in fluid communication with said water discharge openings;
   a first irrigation span structure including a water delivery pipe with inner and outer ends;
   said inner end of said first irrigation span structure being in fluid communication with said outer end of said horizontal pipe portion of said T-connector;
   a second irrigation span structure including a water delivery pipe with inner and outer ends;
   said inner end of said second irrigation span structure being operably pivotally attached to said upper end of said vertical pipe portion of said T-connector and being in fluid communication therewith;
   each of said first and second irrigation span structures being supported upon at least one self-propelled drive unit;
   each of said water delivery pipes of said first and second irrigation span structures having a plurality of spaced-apart sprinklers associated therewith for irrigating the area adjacent said first and second irrigation span structures;
   each of said first and second irrigation span structures being supported upon at least one self-propelled drive unit;
   each of said first and second irrigation span structures being independently pivotally movable with respect to said center pivot structure.

17. The center pivot irrigation system of claim 16 wherein each of said radially spaced openings are oval in shape.

18. The center pivot irrigation system of claim 17 wherein each of said oval openings have a longitudinal axis which is parallel to the longitudinal axis of said water supply pipe.

19. The center pivot irrigation system of claim 18 wherein said water supply pipe has elongated reinforcing members secured to its inner surface which extend across said water discharge openings.

20. The center pivot irrigation system of claim 16 wherein each of said first and second irrigation span structures are independently pivotally movable with respect to said center pivot structure.

21. A multi-span center pivot irrigation system, comprising:
   a center pivot structure including a vertically extending water supply pipe having upper and lower ends;
   said water supply pipe being fluidly connected to a source of water under pressure;
   a plurality of irrigation span structures each of which include a water delivery pipe with inner and outer ends;
   said inner ends of said irrigation span structures being independently pivotally secured to said center pivot structure and being in fluid communication with said water supply pipe;
   each of said irrigation span structures being supported upon at least one self-propelled drive unit;
   each of said irrigation span structures having a plurality of spray outlets associated therewith for irrigating the areas adjacent thereto;
   each of said irrigation span structures being independently pivotally movable with respect to said center pivot structure;
   each of said irrigation span structures being independently controllable while moving.

22. The method of irrigating a field, comprising:
   providing a center pivot structure;
   pivotally securing a first self-propelled center pivot irrigation span structure including spray outlets to said center pivot structure;
   pivotally securing a second self-propelled center pivot irrigation span structure including spray outlets to said center pivot structure which is disposed at an angle with respect to said first span structure;
   and independently moving said first and second irrigation span structures over the field to be irrigated.

23. A method of increasing the germination rate of seedlings, comprising the steps of:
   providing a center pivot structure which has a source of irrigation water associated therewith;
   providing a first self-propelled irrigation span having inner and outer ends;
   providing a second self-propelled irrigation span having inner and outer ends;
   independently pivotally connecting said inner ends of said first and second irrigation spans to said center pivot structure so that said first and second irrigation spans extend outwardly therefrom in an angular spaced-apart relationship with respect to one another and so that said inner ends of said first and second irrigation spans are in fluid communication with said source of irrigation water;
   pumping irrigation water through said first and second irrigation spans while said first and second irrigation spans are moved over the seedlings to irrigate the same.

24. A method of increasing the germination rate of seedlings, comprising the steps of:
   providing a center pivot structure adjacent the area where the seedlings have been planted with the said center pivot structure including a source of irrigation water under pressure;

connecting one end of a first self-propelled center pivot irrigation span to said center pivot structure and said source of irrigation water so that said first span may pass over the area where the seedlings have been planted;

connecting one end of a second self-propelled center pivot irrigation span to said center pivot structure and said source of irrigation water so that said second span may pass over the area where the seedlings have been planted with the said second span being positioned with respect to said first span at a predetermined included angle;

independently operating and controlling said first and second spans to vary the included angle therebetween so that the distance between said first and second spans may be selectively varied.

* * * * *